United States Patent
Huang

(10) Patent No.: US 9,549,171 B2
(45) Date of Patent: Jan. 17, 2017

(54) TIME-MULTIPLEXED MULTIPLE VIEW PROJECTION APPARATUS

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 299 days.

(21) Appl. No.: 14/290,566

(22) Filed: May 29, 2014

(65) Prior Publication Data

US 2015/0215609 A1 Jul. 30, 2015

(30) Foreign Application Priority Data

Jan. 27, 2014 (TW) .............................. 103102880 A

(51) Int. Cl.
| | | |
|---|---|---|
| *G03B 21/00* | (2006.01) | |
| *H04N 13/04* | (2006.01) | |
| *H04N 9/31* | (2006.01) | |
| *G03B 35/16* | (2006.01) | |

(52) U.S. Cl.
CPC ............ *H04N 13/045* (2013.01); *G03B 35/16* (2013.01); *H04N 9/3126* (2013.01); *H04N 9/3129* (2013.01); *H04N 13/0418* (2013.01); *H04N 13/0427* (2013.01); *H04N 13/0459* (2013.01); *G03B 21/006* (2013.01)

(58) Field of Classification Search
CPC ......... G03B 21/00; G03B 21/20; G03B 21/14; H04N 13/04; H04N 9/31
See application file for complete search history.

(56) References Cited

U.S. PATENT DOCUMENTS 6,178,043 B1    1/2001 Son et al.
2011/0316898 A1* 12/2011 Nam .................. G02B 27/2214
                                                345/690

FOREIGN PATENT DOCUMENTS

| CN | 103513438 A | 1/2014 |
|---|---|---|
| TW | 201241476 A1 | 10/2012 |

* cited by examiner

*Primary Examiner* — Sultan Chowdhury
*Assistant Examiner* — Danell L Owens
(74) *Attorney, Agent, or Firm* — Muncy, Geissler, Olds & Lowe, P.C.

(57) ABSTRACT

A time-multiplexed multiple view projection apparatus is provided. The apparatus includes: a pixel module for producing a plurality of light images sequentially; and a projection module for receiving the light images and forming a first row of light images and a second row of light images on a stop, wherein one of the first row of light images and the second row of light images is on top of the other. The projection module further includes: a first steering lens for projecting the first row of light images onto a first set of view angles on a screen; and a second steering lens for projecting the second row of light images onto a second set of view angles on the screen, wherein the first set of view angles and the second set of view angles are on the right and left of the screen respectively.

8 Claims, 9 Drawing Sheets

TIME-MULTIPLEXED MULTIPLE VIEW PROJECTION APPARATUS

CROSS REFERENCE TO RELATED APPLICATIONS

This Application claims priority of Taiwan Patent Application No. 103102880, filed on Jan. 27, 2014, the entirety of which is incorporated by reference herein.

BACKGROUND OF THE INVENTION

Field of the Invention

The present invention relates to a time-multiplexed multiple view projection technology.

Description of the Related Art

Autostereoscopy, also known as naked-eye stereoscopic technology, is a new trend of development for stereoscopic displays. With autosteroscopy displays, viewers can watch stereo images with the naked eyes without the burden of traditional 3D glasses.

The autostereoscopy display technology in the prior art includes spatial-multiplexed technology and time-multiplexed technology. The spatial-multiplexed technology includes parallax barrier displays and lenticular lens displays. However, both displays have problems with aligning images. In addition, the spatial-multiplexed displays have poor image resolution as the number of view angles increases.

Time multiplex multiple view displays can avoid the shortcomings of the spatial-multiplexed displays. The time multiplex multiple view displays can project a plurality of images sequentially onto different angles of a viewing plane, so that the right and left eyes of a viewer can respectively receive images with different parallax and experience 3D visual perception.

However, the time multiplex multiple view displays usually use lots of light valves, which are nearly as big as human eye box. Therefore, when a projection apparatus has a limited size, the number of its viewing angles will be accordingly limited. In addition, the time multiplex multiple view displays in the prior art usually use several projecting lamps, which occupy lots of space in the projection apparatus.

In order to avoid the problems of the conventional technology, and further improve light utilization efficiency, the present invention provides a new time-multiplexed multiple view projection apparatus.

BRIEF SUMMARY OF THE INVENTION

The present invention provides a time-multiplexed multiple view projection apparatus. The apparatus includes: a pixel module, for producing a plurality of light images sequentially; and a projection module, for receiving the light images, and forming a first row of light images and a second row of light images on a lens stop, wherein one of the first row of light images and the second row of light images is on top of the other. The projection module further includes: a first steering lens for projecting the first row of light images onto a first set of view angles on a screen, and a second steering lens for projecting the second row of light images onto a second set of view angles on the screen, wherein the first set of view angles and the second set of view angles are on the right and left of the screen respectively.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides a new time-multiplexed multiple view projection apparatus to overcome the shortcomings in the prior art and improve the light utilization efficiency. For illustration, the present invention will be described with the following preferred embodiments. Note that although a particular projection apparatus is described below, the present invention should not be limited thereto, and those skilled in the prior art can apply the features of the present invention to various projection apparatuses.

Figure 1:
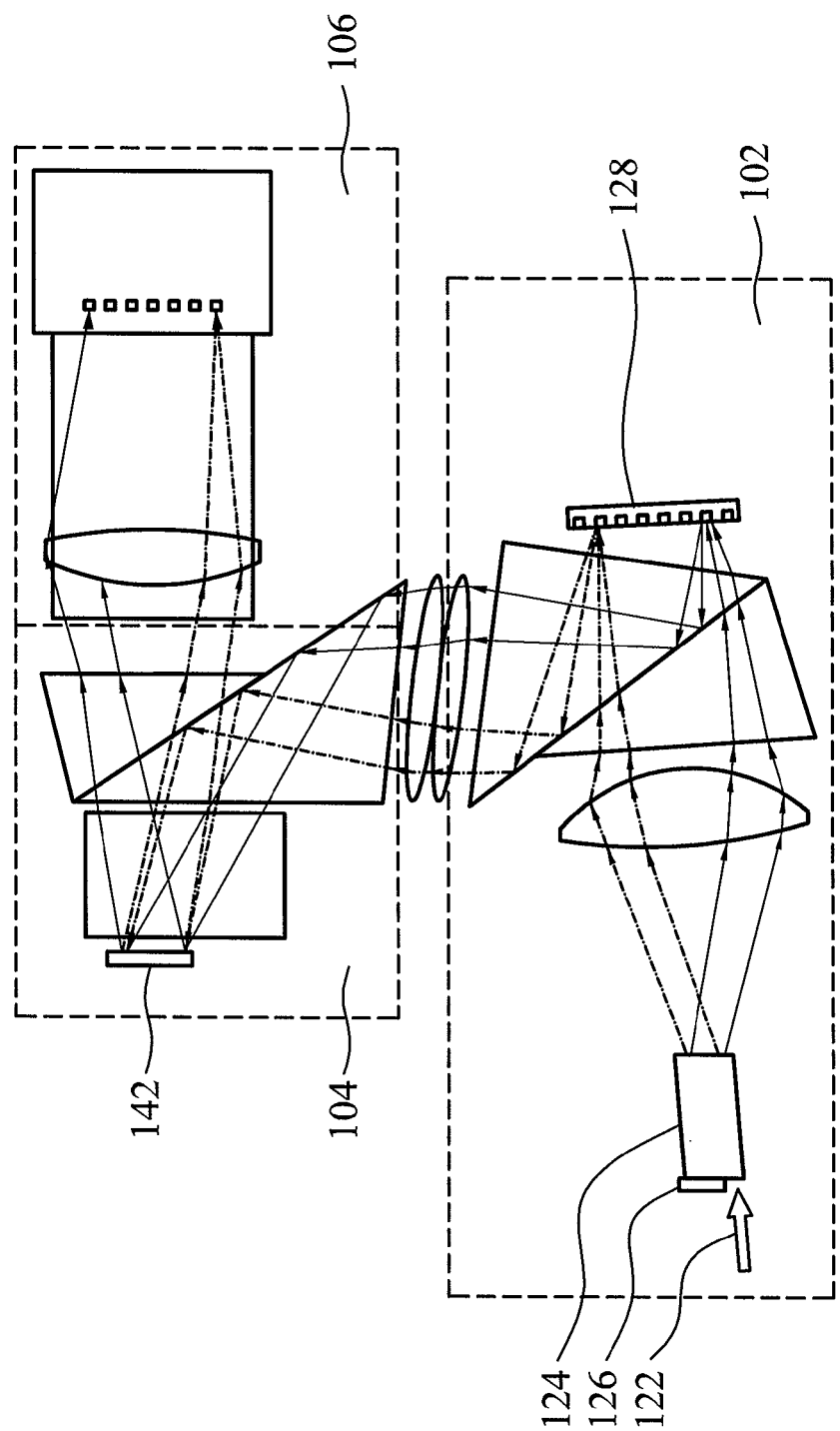
FIG. 1 is a schematic diagram of the time-multiplexed multiple view projection apparatus according to a preferred embodiment of the present invention.

FIG. 1 is a schematic diagram of the time-multiplexed multiple view projection apparatus according to a preferred embodiment of the present invention. In this preferred embodiment, the projection apparatus of the present invention comprises a light module 102, a pixel module 104 and a projection module 106. The light module 102 further comprises a laser source 122, an integration rod 124 and a scan light source array 128.

In order to efficiently use the lights, the light module 102 of the present invention only has one single laser source 122. Due to its smaller etendue, the laser source 122 can focus the lights in a specific target area. As shown in FIG. 2, the laser source 122 projects the laser lights unto the scan light source array 128 through the integration rod 124 and several optical components (such as prisms and lenses). The scan light source array 128 has a plurality of light valves, and can simulate a series of lamps by opening and closing each of the light valves. In an embodiment, the entrance of the integration rod 124 of the present invention, except the part through which the laser light passes, is covered by a reflection mirror 126. The reflection mirror 126 can recycle the reflected light and thus improve the light utilization efficiency.

Figure 5:
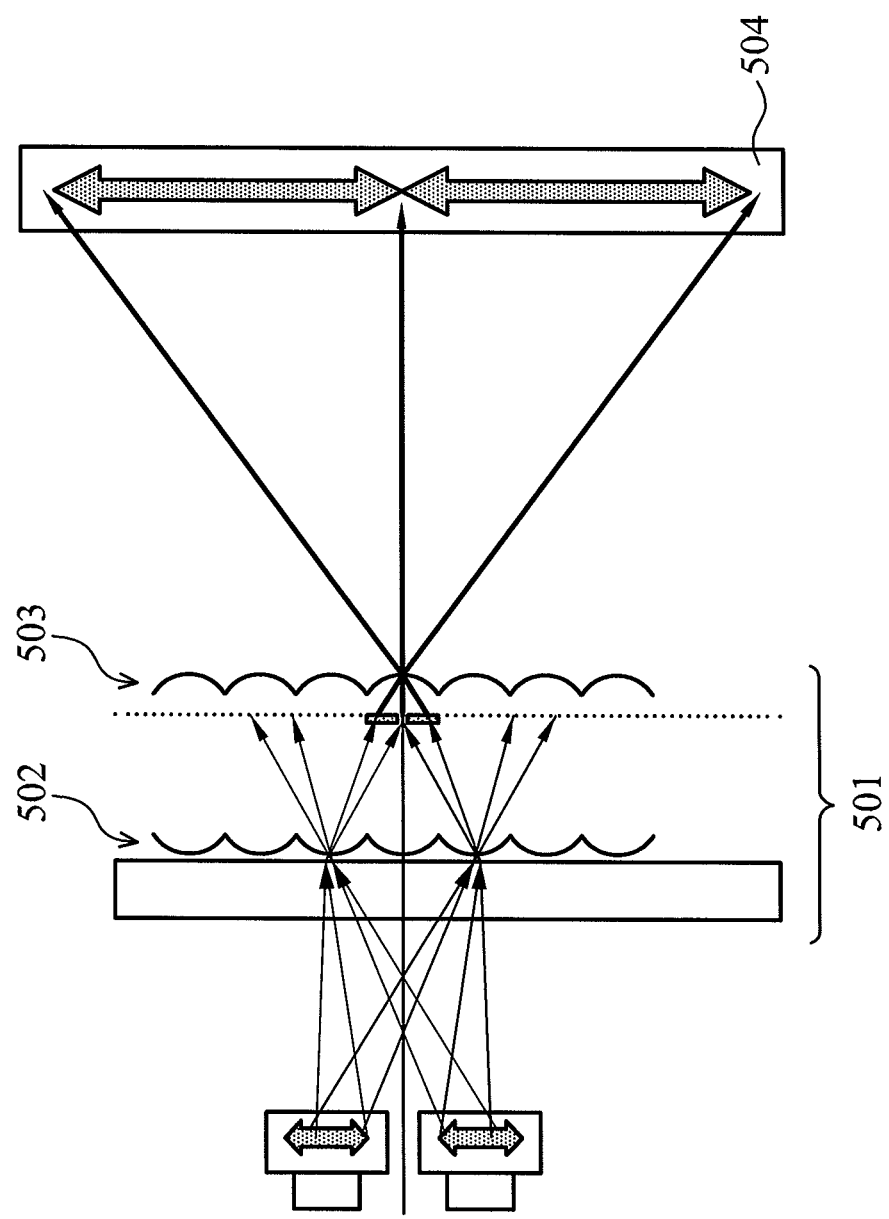
FIG. 5 shows the first set of view angles 432 and the second set of view angles 434.

The present invention also improves the scan light source array 128. In an embodiment, the scan light source array 128 is a digital micro-mirror device (DMD), which is mainly composed of a plurality of digital micro-mirrors. The digital micro-mirror device helps to further reduce the size of the target projection area (i.e., scan light source array 128) of the laser source 122. FIG. 2B is a light distribution diagram of the digital micro-mirror device when the light is in, out and off. Generally, the digital micro-mirror device is disposed in a pixel module, such as the digital micro-mirror device 142 of the pixel module 104 on an "imaging light path", which will be described later. In an embodiment, as shown in FIG. 2B, when the digital micro-mirror device of the pixel module turns to −12°, the incident light will be reflected to the "off" direction; and when the digital micro-mirror device turns to +12°, the incident light will be reflected out (as an emitted light) to the next optical components, and finally projected to the screen 501 as shown in FIG. 5.

Figure 2A:
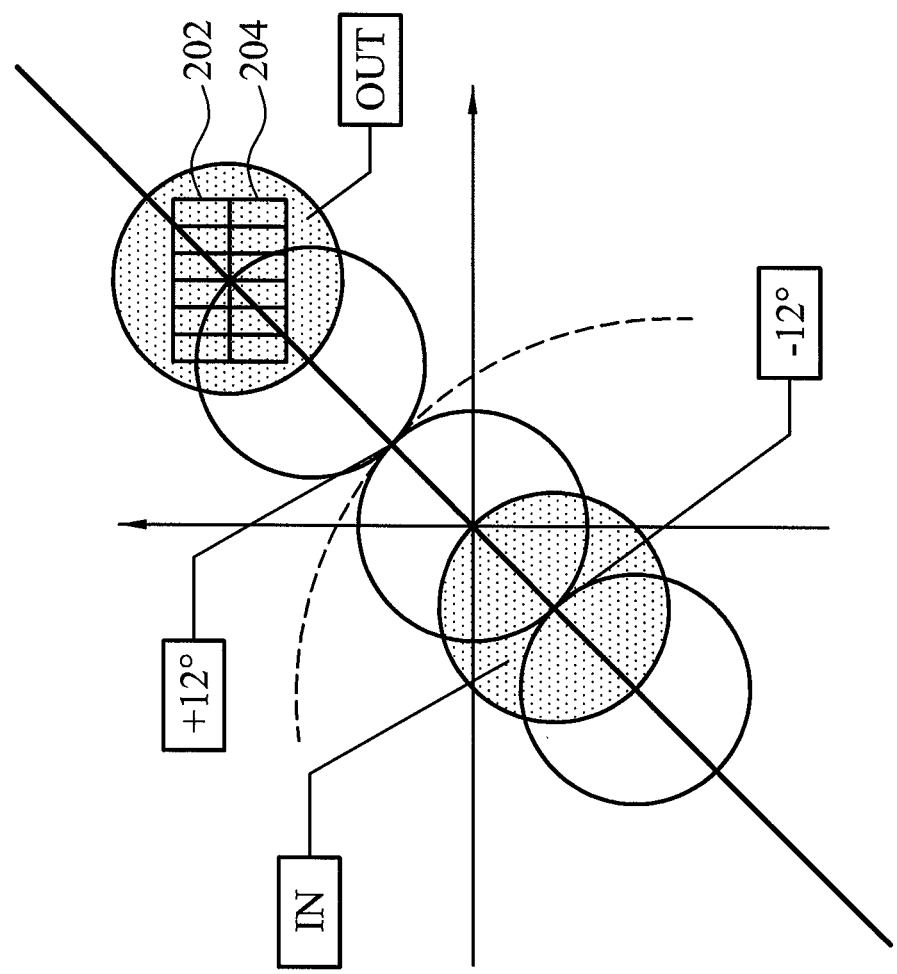
FIG. 2A is a light distribution diagram of the digital micro-mirror device of the scan light source array 128 on an "illumination light path" when the light is in and out.
Figure 2B:
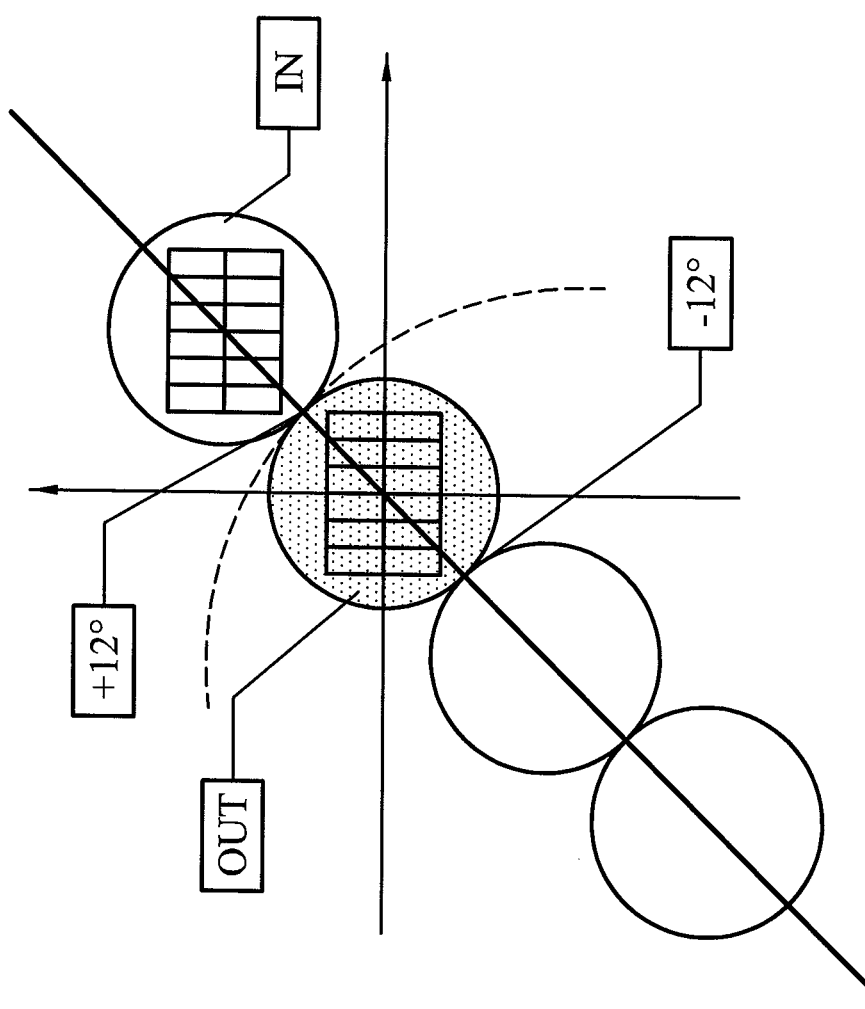
FIG. 2B is a light distribution diagram of the digital micro-mirror device when the light is in, out and off.

FIG. 2A is a light distribution diagram of the digital micro-mirror device of the scan light source array 128 on an "illumination light path" when the light is in and out. Due to different applications of the digital micro-mirror device, FIG. 2A has different light distribution pattern from that in FIG. 2B. When the laser light enters the digital micro-mirror device from −12°, it will be reflected back to the integration rod 124 via its original incident light path (off state); and when digital micro-mirror device turns to +12°, the incident light from −12° will be reflected to the next optical component, i.e., the digital micro-mirror device 142 of the pixel module 104.

The present invention can further control the illuminated area of the incident lights to improve the light utilization efficiency. As shown in FIG. 2A, the digital micro-mirror device of the scan light source array 128 is arranged into two rows, including a first row of light sources 202 and a second row of light sources 204. The first row of light sources 202 is on top of the second row 204. With this arrangement of the rows in the scan light source array 128, the projected range of the laser source 12 can be more concentrated, thus avoiding wasting energy in a spatial arrangement where the light sources are all arranged in a single line. Note that although there are only rows of light sources in this embodiment, those skilled in the art can understand that the number of the rows of the light sources should not be limited thereto. In addition, in some embodiments, the scan light source array 128 can be composed of liquid-crystal slits or other devices.

Each row of the scan light source array 128 has a plurality of scan light sources, which will turn on and off sequentially. There is only one light source in the array which will be turned on at the same time, and all of the light sources will be turned on and off sequentially, so it has the name "scan". In the embodiment of FIG. 2A, each of the first row 202 and the second row 204 has 6 scan light sources (12 scan light sources in total). The 12 scan light sources sequentially provide light to the digital micro-mirror device 142 of the pixel module 104, and the digital micro-mirror device 142 receives the light and produces 12 corresponding light images (each of the light images has a plurality of pixels) on a lens stop of the projection module 106 which will be described later. Specifically, the corresponding light images produced by the digital micro-mirror device 142 on the lens stop include a first row of light images on the top and a second row of light images on the bottom.

Figure 3:
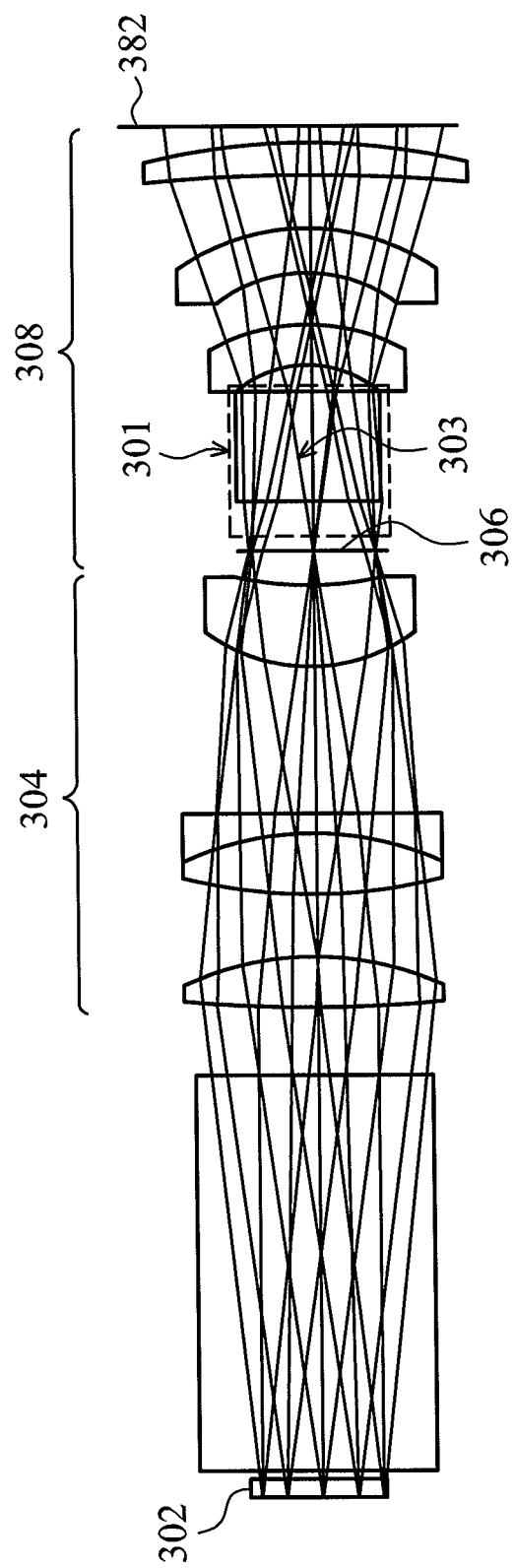
FIG. 3 is a schematic diagram of the projection module of the present invention.

The light images produced by the pixel module 104 will be sent to the projection module 106, and the projection module 106 will sequentially project the light images onto a series of viewing angles of the screen, resulting in time-multiplexed multiple views effect. Note that, although there are 12 scan light sources, 12 light images and 12 viewing angles in the embodiment, the number thereof should not be limited thereto, and can be modified according to various design requirements. More details of the projection module 106 (FIG. 1) of the present invention are shown in FIG. 3. FIG. 3 is a schematic diagram of the projection module of the present invention. The projection module has a front projection array 304 and a back projection lens 308. The lens stop 306 is disposed between the front projection array 304 and the back projection lens 308. Note that there should be enough room 301 between the lens stop 306 and the back projection lens 308 for turning the path of the lights twice, which will be described in detail later. The front projection array 304 can project the light images provided by the pixel module 302 on the stop 306, and the back projection lens 304 can further project the light images of the stop 306 onto a screen 382.

Figure 4A:
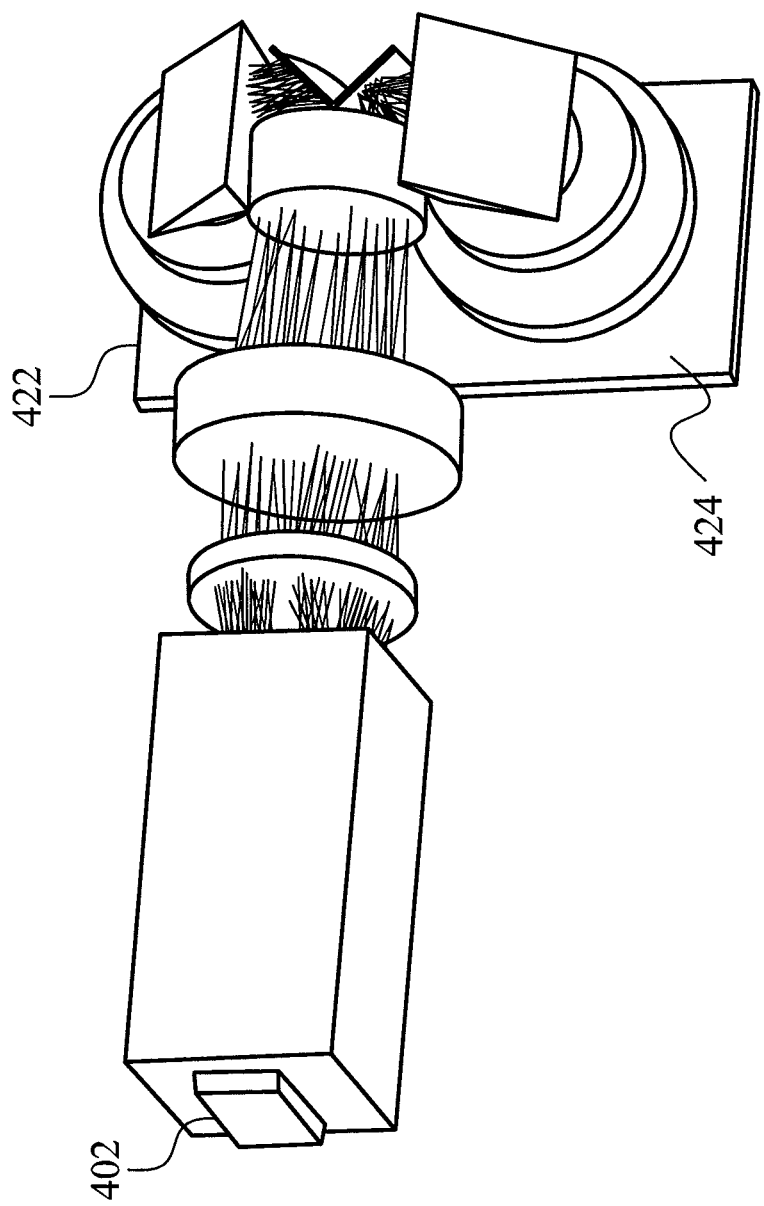
FIG. 4A is a perspective view of the main structure of the time-multiplexed multiple view projection apparatus according to an embodiment of the present invention.
Figure 4B:
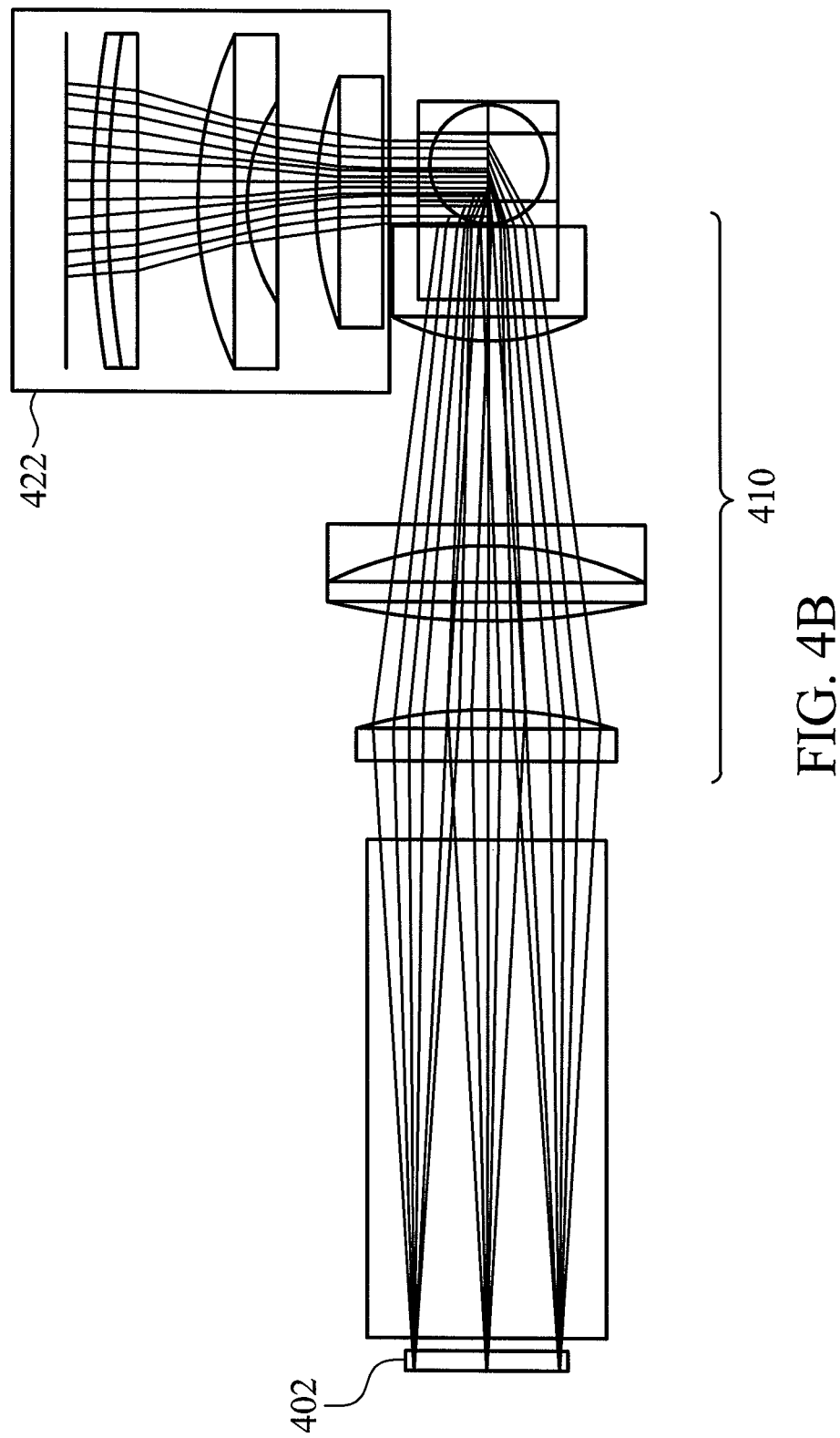
FIGS. 4B, 4C and 4D are respectively the top side view, the rear side view and the left side view of FIG. 4A.
Figure 4C:
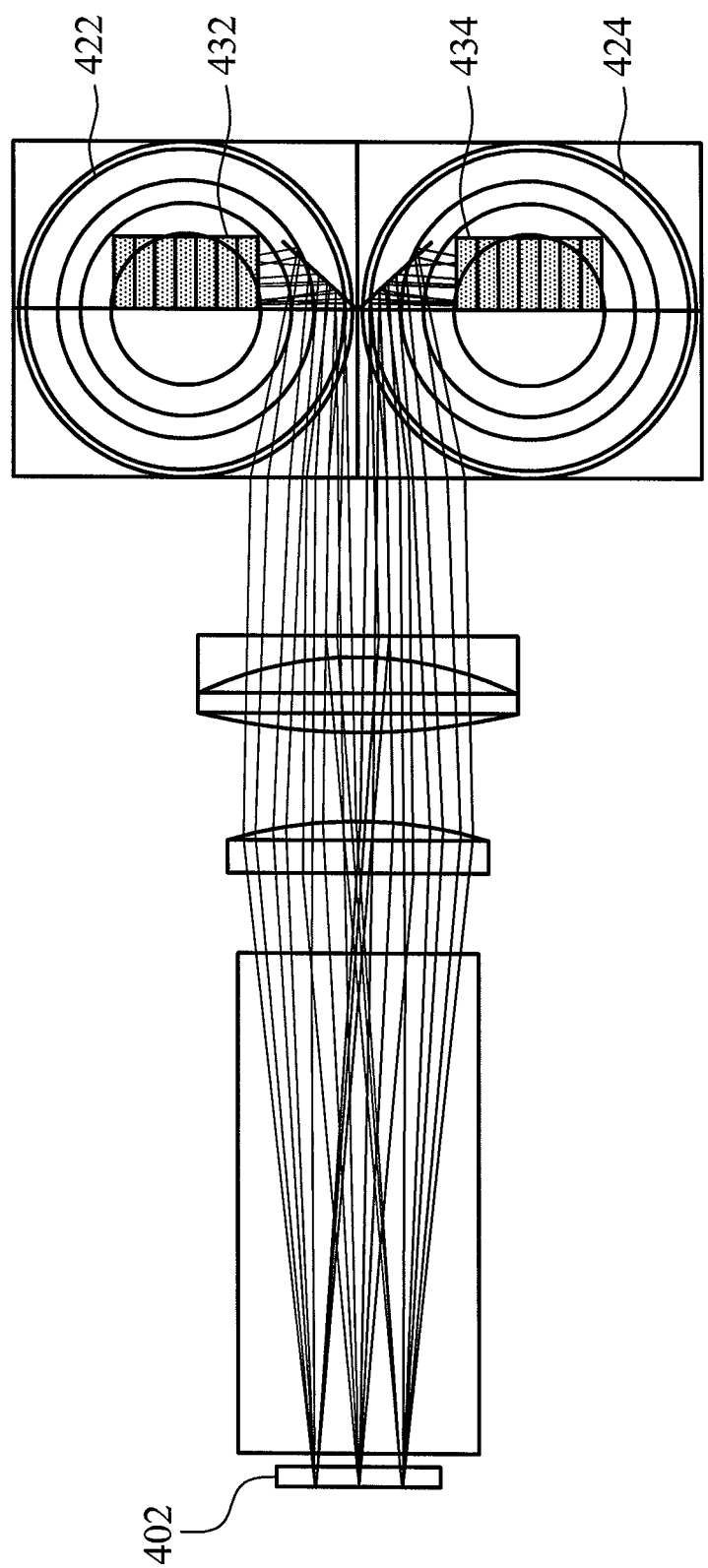
Figure 4D:
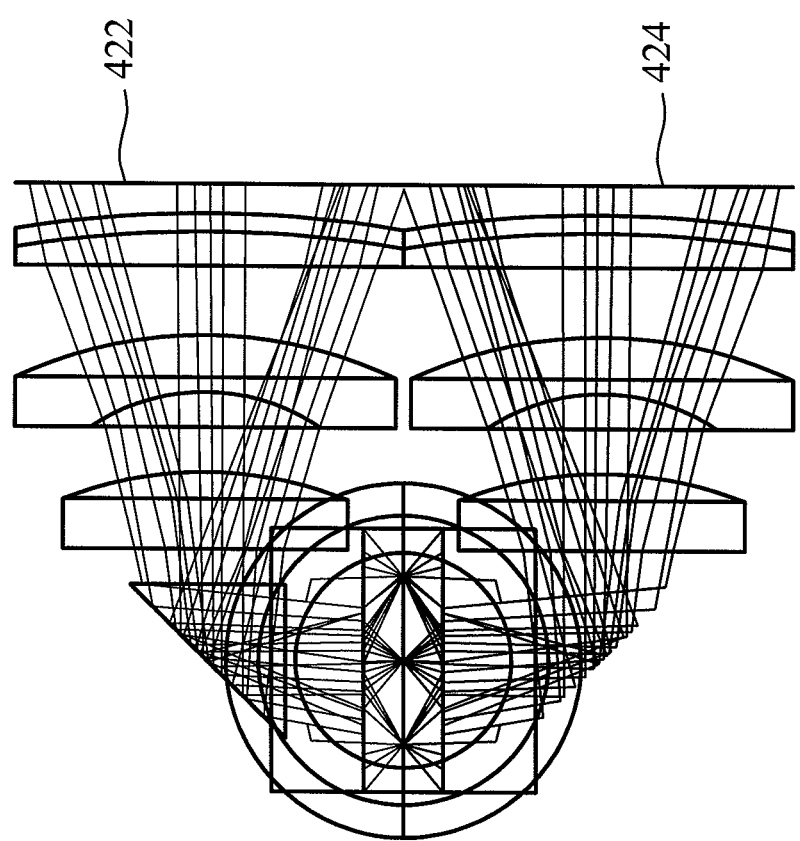

Since the viewing angles on the screen have to be arranged in the same line, the present invention provides a special manner to re-arrange the light images and form the viewing angles. FIG. 4A is a perspective view of the main structure of the time-multiplexed multiple view projection apparatus according to an embodiment of the present invention. FIGS. 4B, 4C and 4D are respectively the top side view, the rear side view and the left side view of the time-multiplexed multiple view projection apparatus in FIG. 4A. Similarly to the prior art, the front projection array of the projection apparatus of the present invention receives the light images from the pixel module 402. The difference between the present invention and the prior art is that the back projection lens of the projection apparatus of the present invention further comprises a first steering lens 422 and a second steering lens 424. Refer to FIG. 4C, the first steering lens 422 can turn the first row of light images from the pixel module 402 (which corresponds to the first row of light sources 202 in FIG. 2A) twice. Firstly, the lights (that are projected from the left part to the right part on the plane of FIG. 2A) are reflected upward; and then reflected into the plane of FIG. 2A. Finally, the first steering lens 422 projects the lights onto the screen and forms the first set of view angles 432. Similarly, the second steering lens 424 of the present invention can turn the second row of light images (which correspond to the second row of light sources 204 in FIG. 2A) twice. Firstly, the lights (that are projected from the left part to the right part on the plane of FIG. 2A) are reflected downward; and then reflected into the plane of FIG. 2A. Finally, the second steering lens 424 projects the lights onto the screen and forms the second set of view angles 434.

Refer to FIG. 5, the first set of view angles 432 and the second set of view angles 434 are projected to the screen 501, and respectively imaged on the first lenticular array 502 of the screen as two groups of light spots which are arranged in the same line. The two groups of light spots are then imaged on the second lenticular array 503 of the screen, and respectively projected to left part and right part of the viewing plane 504. In an embodiment, the front projection array 410 is the front projection array 304, and the combination of the first and the second steering lenses 422 and 424 is the back projection lens 308. Those skilled in the art can understand that there are various manners to implement the steering lenses 422 and 424. For example, the steering lenses 422 and 424 can be composed of a reflection mirror and a total internal reflection prism (TIR prism), as shown in FIG.

4. However, in other embodiments, the number and the arrangement of the reflection mirrors or prisms should not be limited to said embodiments.

Note that there are only two light images (and only two rows of light sources) which are illustrated in the embodiments, however, those skilled in the art can apply the present invention to the embodiments that have more than two rows of the light images. For example, one can connect a plurality of back projection lenses (each having two steering lenses) in a cascade to turn a plurality of light image rows. The steering lenses of the present invention can not only be used in the projection system that has the scan light sources described above, but also in various conventional projection systems having one or more than one light sources such as lamps.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A time-multiplexed multiple view projection apparatus, comprising:
    a pixel module, for producing a plurality of light images sequentially; and
    a projection module, for receiving the light images, and forming a first row of light images and a second row of light images on a stop, wherein one of the first row of light images and the second row of light images is on top of the other; and the projection module further comprising:
        a first steering lens, for projecting the first row of light images onto a first set of view angles on a screen; and
        a second steering lens, for projecting the second row of light images onto a second set of view angles on the screen,
    wherein the first set of view angles and the second set of view angles are on the right and left of the screen respectively.

2. The time-multiplexed multiple view projection apparatus as claimed in claim 1, further comprising:
    a light module, for providing a plurality of scan lights to the pixel module, comprising:
        a scan light source array, further comprising a first row of light sources and a second row of light sources, wherein one of the first row of light sources and the second row of light sources is on top of the other, and respectively correspond to the first row of light images and the second row of light images.

3. The time-multiplexed multiple view projection apparatus as claimed in claim 2, wherein the scan light source array is composed of a plurality of liquid-crystal slits.

4. The time-multiplexed multiple view projection apparatus as claimed in claim 2, wherein the scan light source array is a digital micro-mirror device (DMD) comprising a plurality of digital micro-mirrors.

5. The time-multiplexed multiple view projection apparatus as claimed in claim 2, wherein the light module further comprises a laser source, for projecting laser light onto the scan light source array.

6. The time-multiplexed multiple view projection apparatus as claimed in claim 5, the light module further comprising an integration rod, for integrating the laser light, wherein an entrance of the integration rod, except the part through which the laser light passes, is covered by a reflection mirror.

7. The time-multiplexed multiple view projection apparatus as claimed in claim 1, wherein each of the first the second steering lens further comprises a reflection mirror and a total internal reflection (TIR) prism.

8. The time-multiplexed multiple view projection apparatus as claimed in claim 1, wherein the projection module comprises:
    a front projection array, disposed between the pixel module and the stop; and
    a back projection lens, disposed between the stop and the screen, and comprising the first steering lens and the second steering lens.

* * * * *